(12) United States Patent
Haddy

(10) Patent No.: US 8,823,492 B2
(45) Date of Patent: *Sep. 2, 2014

(54) DETECTION OF INCURSION OF PROPOSED EXCAVATION ZONES INTO BURIED ASSETS

(71) Applicant: Alan Haddy, Naples, FL (US)

(72) Inventor: Alan Haddy, Naples, FL (US)

(*) Notice: Subject to any disclaimer, the term of this patent is extended or adjusted under 35 U.S.C. 154(b) by 0 days.

This patent is subject to a terminal disclaimer.

(21) Appl. No.: 14/060,301

(22) Filed: Oct. 22, 2013

(65) Prior Publication Data

US 2014/0049374 A1 Feb. 20, 2014

Related U.S. Application Data

(63) Continuation-in-part of application No. 13/745,846, filed on Jan. 20, 2013, which is a continuation of application No. 13/543,612, filed on Jul. 6, 2012, now Pat. No. 8,358,201.

(51) Int. Cl.
G08C 17/02 (2006.01)

(52) U.S. Cl.
CPC ..................... G08C 17/02 (2013.01)
USPC ............................. 340/8.1; 702/130

(58) Field of Classification Search
CPC ............... G06F 15/00; G06Q 10/00
USPC ............... 702/130; 705/7, 11; 340/686.6, 8.1; 707/104.1

See application file for complete search history.

(56) References Cited

U.S. PATENT DOCUMENTS

| 2010/0088164 A1* | 4/2010 | Nielsen et al. | 705/11 |
| 2010/0161359 A1* | 6/2010 | Asher | 705/7 |
| 2011/0191058 A1* | 8/2011 | Nielsen et al. | 702/130 |

* cited by examiner

Primary Examiner — Steven Lim
Assistant Examiner — Kaleria Knox
(74) Attorney, Agent, or Firm — Mark Terry

(57) ABSTRACT

A method on a computing device for defining a buffer zone around a buried asset at an above-surface location is provided that solves the above-described problems. The method includes receiving and storing buried asset data points, wherein each buried asset data point comprises a geographical coordinate and a precision data value corresponding to the geographical coordinate, for a buried asset, wherein the buried asset data points correspond to signals that were detected and read from the buried asset at the above-surface location. The method further includes generating a first data structure that represents a two dimensional area comprising a buffer zone at the above-surface location, wherein the first data structure is generated by defining an area around each geographical coordinate, wherein a size of each area is based on the precision data values of the buried asset data points.

20 Claims, 13 Drawing Sheets ation site, detecting the relevant buried assets and physically marking the position of the buried asset using temporary paint or flags. Usually, a technician visiting a proposed excavation site utilizes a device known as a conventional locator—a commercial, off-the-shelf, utility locator that detects and identifies buried assets using radio frequency and/or magnetic sensors. Upon completion of this procedure by the appropriate utility companies, excavation can occur with the security that buried assets will not be damaged.
DETECTION OF INCURSION OF PROPOSED EXCAVATION ZONES INTO BURIED ASSETS

CROSS-REFERENCE TO RELATED APPLICATIONS

This patent application is a continuation in part of, and claims priority to, patent application Ser. No. 13/745,846 filed Jan. 20, 2013 and entitled "Storage and Recall of Buried Asset Data Over Communications Networks for Damage Avoidance and Mapping," which is a continuation of patent application Ser. No. 13/543,612 filed Jul. 6, 2012 and entitled "Storage and Recall of Buried Asset Data Over Communications Networks for Damage Avoidance and Mapping." The subject matter of patent application Ser. Nos. 13/543,612 and 13/745,846 are hereby incorporated by reference in their entirety.

STATEMENT REGARDING FEDERALLY SPONSORED RESEARCH OR DEVELOPMENT

Not Applicable.

INCORPORATION BY REFERENCE OF MATERIAL SUBMITTED ON A COMPACT DISC

Not Applicable.

TECHNICAL FIELD

The technical field relates generally to the detection and identification of buried assets (i.e., underground utility lines) and, more specifically, to processes for identifying when an intended excavation can interfere with a buried asset.

BACKGROUND

Utility lines, such as lines for telephones, electricity distribution, natural gas, cable television, fiber optics, Internet, traffic lights, street lights, storm drains, water mains, and wastewater pipes, are often located underground. Utility lines are referred to as "buried assets" herein. Consequently, before excavation occurs in an area, especially an urban area, an excavator is typically required to clear excavation activities with the proper authorities. The clearance procedure usually requires that the excavator contact a central authority (such as "One Call", "811" and "Call Before You Dig," which are well known in the art) which, in turn, sends a notification to the appropriate utility companies. Subsequently, each utility company must perform a buried asset detection procedure, which includes having a field technician visit the proposed excavation site, detecting the relevant buried assets and physically marking the position of the buried asset using temporary paint or flags. Usually, a technician visiting a proposed excavation site utilizes a device known as a conventional locator—a commercial, off-the-shelf, utility locator that detects and identifies buried assets using radio frequency and/or magnetic sensors. Upon completion of this procedure by the appropriate utility companies, excavation can occur with the security that buried assets will not be damaged.

Utility companies are faced with increasing requests to locate and mark the position of their buried assets to avoid damage from third party excavators, contractors and underground horizontal boring operations. When a utility company receives a notification from the central authority, the utility company must decide whether to: a) dispatch a field technician to physically locate and mark out the buried asset, or b) respond back to the central authority that the utility company is "not involved" and close the ticket, which normally occurs when the proposed excavation area is not within the proximity of a buried asset. Utility companies can lose considerable time and substantial capital by unnecessarily dispatching field technicians to perform locates and mark outs when the proposed excavation area is not within the proximity of a buried asset. These false dispatches can be due to inaccurate map records or unknown buried asset position relative to the proposed excavation or boring zone.

Therefore, a need exists for improvements over the prior art, and more particularly for more efficient methods and systems for determining when a site visit by a field technician is required, with respect to a proposed excavation site.

SUMMARY

A method on a computing device for defining a buffer zone around a buried asset at an above-surface location is provided. This Summary is provided to introduce a selection of disclosed concepts in a simplified form that are further described below in the Detailed Description including the drawings provided. This Summary is not intended to identify key features or essential features of the claimed subject matter. Nor is this Summary intended to be used to limit the claimed subject matter's scope.

In one embodiment, a method on a computing device for defining a buffer zone around a buried asset at an above-surface location is provided that solves the above-described problems. The method includes receiving and storing a plurality of buried asset data points, wherein each buried asset data point comprises a geographical coordinate and a precision data value corresponding to the geographical coordinate, for a buried asset, wherein the plurality of buried asset data points correspond to analog radio frequency signals that were detected and read from the buried asset at the above-surface location. The method further includes generating a first data structure that represents a two dimensional area comprising a buffer zone at the above-surface location, wherein the first data structure is generated by defining an area around each geographical coordinate of the plurality of buried asset data points, wherein a size of each area is based on the precision data values of the plurality of buried asset data points.

In another embodiment, the method further includes receiving a second data structure that represents a two dimensional area comprising an excavation zone at the above-surface location, calculating whether the two dimensional area of the first data structure intersects with the two dimensional area of the second data structure, and transmitting a request for a locate procedure to a user via a communications network communicatively coupled with the computing device, if the two dimensional area of the first data structure intersects with the two dimensional area of the second data structure.

BRIEF DESCRIPTION OF THE DRAWINGS

The accompanying drawings, which are incorporated in and constitute a part of this disclosure, illustrate various example embodiments. In the drawings.

DETAILED DESCRIPTION

Figure 1:
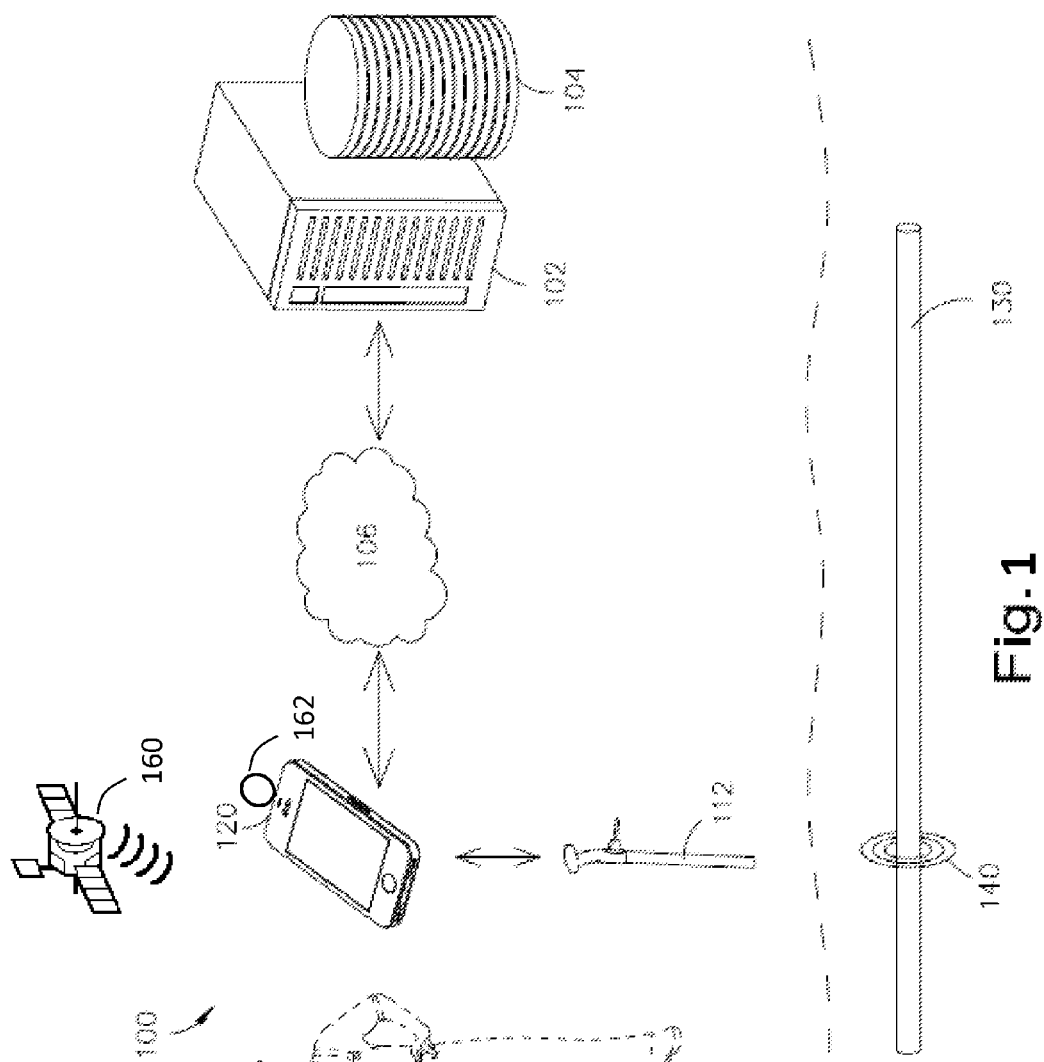
FIG. 1 is a diagram of an operating environment that supports a process on a server for defining a buffer zone around a buried asset and comparing the buffer zone to a proposed excavation zone, according to an example embodiment.

The following detailed description refers to the accompanying drawings. Wherever possible, the same reference numbers are used in the drawings and the following description to refer to the same or similar elements. While embodiments of the invention may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the invention. Instead, the proper scope of the invention is defined by the appended claims.

The present invention improves over the prior art by providing a more efficient way of determining when a site visit by a field technician (i.e., a dispatch) is required, with respect to a proposed excavation site. The example embodiments automatically create a virtual two-dimensional or three-dimensional buffer zone around a buried asset, which can be compared to a proposed excavation zone to determine whether the two overlap, thereby necessitating a site visit by a field technician. The example embodiments reduce the number of false dispatches by enabling electronic analysis, evaluation and comparison of a proposed excavation zone with a buffer zone that has been created around a buried asset's location. A utility company, for example, may automatically and accurately filter incoming locate ticket requests, thus reducing unnecessary field technician dispatches. This decreases the costs associated with buried asset detection in relation to the central authority.

FIG. 1 is a diagram of an operating environment 100 that supports a process on a server 102 for defining a buffer zone around a buried asset and comparing the buffer zone to a proposed excavation zone. The server 102 may be communicatively coupled with a communications network 106, according to an example embodiment. The environment 100 may comprise a mobile computing device 120, which may communicate with server 102 via a communications network 106. Mobile computing device 120 may comprise a cellular telephone, smart phone or tablet computer. Device 120 may also comprise other computing devices such as desktop computers, laptops, and game consoles, for example. The mobile computing device 120 may be connected either wirelessly or in a wired or fiber optic form to the communications network 106. Communications network 106 may be a packet switched network, such as the Internet, or any local area network, wide area network, enterprise private network, cellular network, phone network, mobile communications network, or any combination of the above.

The environment 100 shows that mobile computing device 120 is operated by a technician 110 (i.e., a field technician) and includes an antenna array 112, which may be communicatively coupled, either wirelessly or in a wired or fiber optic form, to the mobile computing device 120. As such, server 102, and devices 120 and 112 may each comprise a computing device 1100, described below in greater detail with respect to FIG. 11. FIG. 1 shows that antenna array 112 detects radio frequency and/or magnetic signals 140 emanating from a buried asset 130.

In another embodiment, the device 120 also calculates its current position and transmits it to the server 102 over network 106. In one embodiment, the device 120 calculates its current position using a Global Positioning System (GPS) receiver, which is a navigation device that receives GPS signals for the purpose of determining the device's current position on Earth. A GPS receiver, and its accompanying processor, may calculate latitude, longitude and altitude information. In this embodiment, a radio frequency signal is received from a GPS transmitter (such as a satellite) comprising a time the signal was transmitted and a position of the transmitter. Subsequently, the device 120 calculates current position data of the device 120 based on the signal, and transmits the current position data to the server 102 via the communications network 106. In another embodiment, the device 120 calculates its current position using alternative services, such as control plan locating, GSM localization, dead reckoning, or any combination of the aforementioned position services. In yet another embodiment, the device 120 also calculates its current compass heading (such as via the use of a compass application) and transmits this data to the server 102 over network 106. In yet another embodiment, the device 120 and/or array 112 receives data from a satellite 160 (or multiple satellites), such as a Global Positioning System (GPS) satellite, and calculates position data based on the data received.

In one embodiment, FIG. 1 shows that device 120 includes a peripheral 162, which may be a high accuracy or high precision GPS module that provides positional data of greater accuracy to device 120. In addition to satellite(s) 160, peripheral 120 may collect data from other sources, such as land-based position data providers that broadcast position data over radio frequency, or additional constellations of satellites.

Alternatively, in lieu of device 120, array 112 and peripheral 162, the technician 110 may utilize a single, integrated locator device that detects and identifies buried assets using radio frequency and/or magnetic sensors, and which further performs the functions of device 120, array 112 and peripheral 162, as described herein.

Server 102 includes a software engine that delivers applications, data, program code and other information to networked device 120. The software engine of server 102 may perform other processes such as transferring multimedia data in a stream of packets that are interpreted and rendered by a software application as the packets arrive. FIG. 1 further shows that server 102 includes a database or repository 104, which may be a relational database comprising a Structured Query Language (SQL) database stored in a SQL server. Mobile computing device 120 may also each include databases. The database 104 may serve buried asset data, as well as related information, which may be used by server 102 and mobile computing device 120.

Server 102, mobile computing device 120 and antenna array 112 may each include program logic comprising computer source code, scripting language code or interpreted language code that perform various functions of the present invention. In one embodiment, the aforementioned program logic may comprise program module 1107 in FIG. 11. It should be noted that although FIG. 1 shows only one mobile computing device 120 and one server 102, the system of the present invention supports any number of servers and mobile computing devices connected via network 106. Also note that although server 102 is shown as a single and independent entity, in one embodiment, server 102 and its functionality can be realized in a centralized fashion in one computer system or in a distributed fashion wherein different elements are spread across several interconnected computer systems.

Environment 100 may be used when a mobile computing device 120 engages in buried asset detection activities that comprise reading, generating, and storing buried asset data in database 104 coupled to server 102. Various types of data may be stored in the database 104 of server 102 with relation to a buried asset that has been detected and located. For example, the database 104 may store one or more records for each buried asset, and each record may include one or more buried asset data points. A buried asset data point may include a current time, a textual map address, and location data or position data, such as latitude and longitude coordinates, geographical coordinates, an altitude coordinate, or the like. A buried asset data point may also include depth measurement data, electrical signal measurement data (such as electrical current measurement data, resistance measurement data, impedance measurement data, electrical signal magnitude measurement data, electrical signal frequency measurement data, electrical signal voltage measurement data, etc.), direction data and orientation data.

A buried asset data point may also include a precision data value corresponding to the geographical coordinate. A precision data value is a value that represents the quality or level of precision of the geographical coordinate. In one embodiment, the precision data value is inversely proportional to the level of precision of quality or level of precision of the geographical coordinate. Thus, when there is a large margin of error or a low confidence level in a geographical coordinate, then the precision data value is high and the quality or level of precision of the geographical coordinate is low. Conversely, when there is a small margin of error or a high confidence level in a geographical coordinate, then the precision data value is low and the quality or level of precision of the geographical coordinate is high. Similarly, a buried asset data point may also include precision data value corresponding to the depth measurement of the buried asset data point. Further, the location record may also include precision data value corresponding to any of electrical signal measurement data defined above.

A buried asset data point may further include one or more images (i.e., photographs) of the physical area of the location. In one embodiment, an image of a physical area corresponding to a location comprises one or more surface markings indicating a position of the one or more buried assets. Markings may include colored or uncolored solid lines, dotted lines, circles, squares, flags, arrows, objects, text or other visual indicia in the image that indicate the actual location of a buried asset. A solid yellow line, for example, may be used in an image of a physical area corresponding to a location in order to indicate the presence of a buried asset in the actual location of the solid yellow line. Lastly, a buried asset data point may include other data, such as the name or unique identifier for the technician that created the record, a time/date stamp indicating a creation and/or modification date of the location record, etc.

Figure 2A:
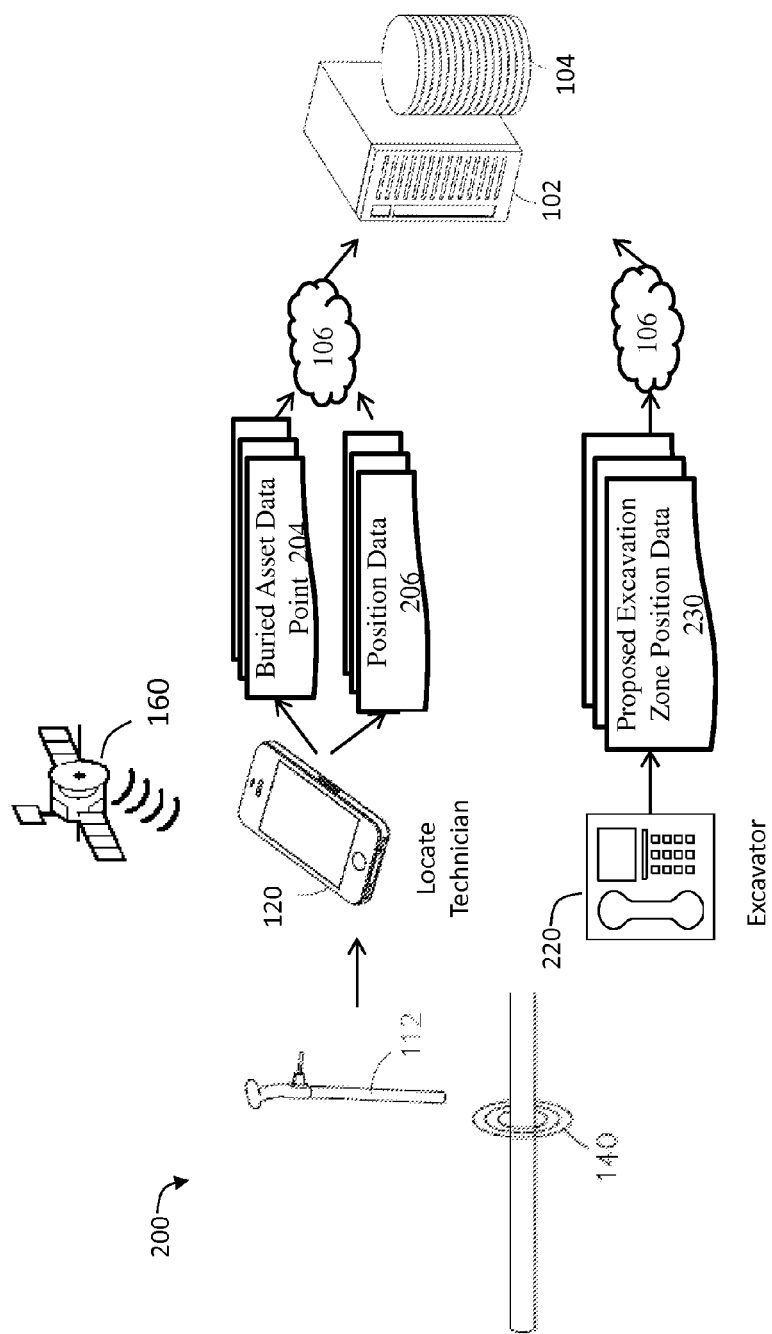
FIG. 2A is a diagram showing the data flow of the general process for defining a buffer zone around a buried asset and comparing the buffer zone to a proposed excavation zone, according to an example embodiment.
Figure 2B:
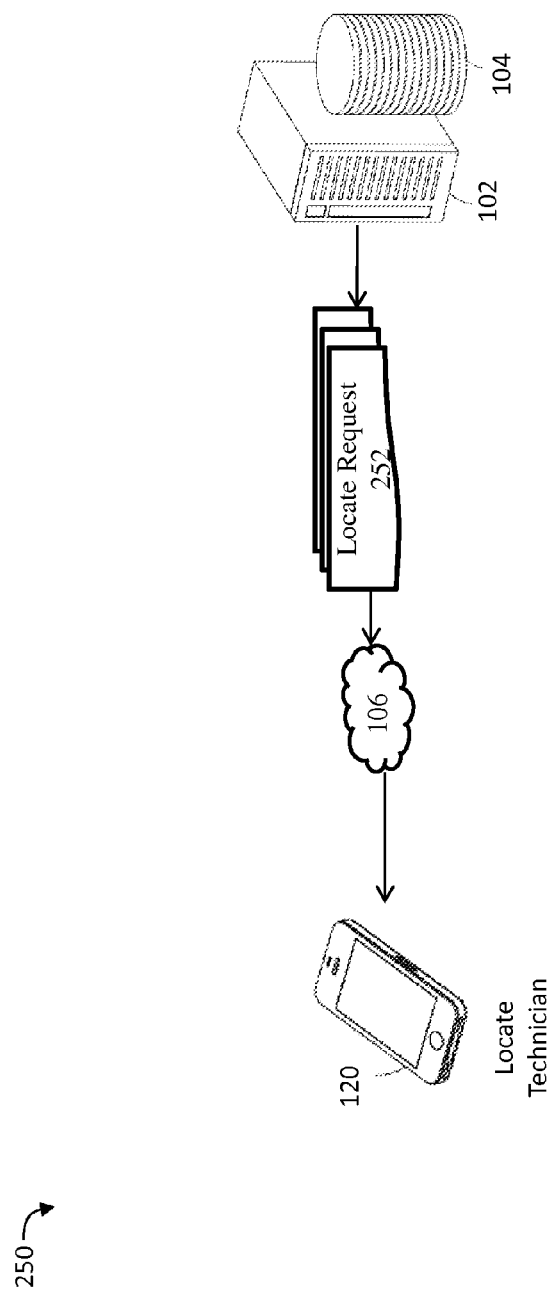
FIG. 2B is a diagram showing the data flow of a process for ordering an on-site visit by a field technician over a communications network, according to an example embodiment.
Figure 3:
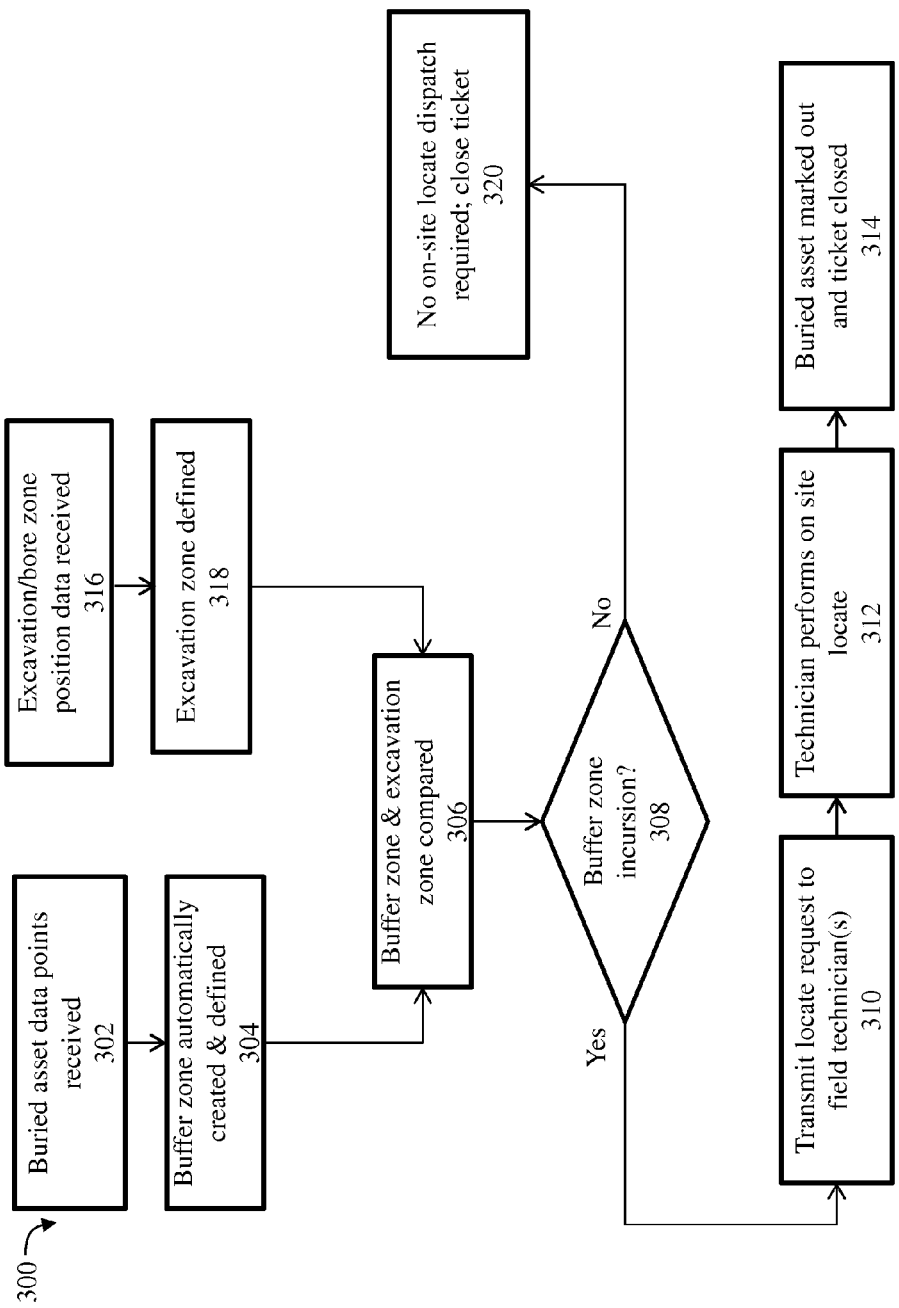
FIG. 3 is a flow chart showing the control flow of the process for defining a buffer zone around a buried asset and comparing the buffer zone to a proposed excavation zone, according to an example embodiment.

FIG. 3 is a flow chart showing the control flow of the process 300 for defining a buffer zone around a buried asset and comparing the buffer zone to a proposed excavation zone, according to an example embodiment. Process 300 describes the steps that occur when the server 102 automatically creates a virtual two-dimensional or three-dimensional buffer zone around a buried asset, which is later compared to a proposed excavation zone to determine whether the two overlap. The process 300 is described with reference to FIGS. 2A and 2B, which shows the general data flow 700 of the process 900.

Process 300 starts with step 302 wherein a locate technician 110 visits an above-ground location. The device 120 utilizes the antenna array 112 to read raw analog signals 140 emanating from a buried asset 130, and calculates additional information, such as position data based on data it has received from the satellite(s) 160. Based on the data it has received and calculated, device 120 calculates one or more buried asset data points 204, wherein each buried asset data point comprises, for example, a geographical coordinate and a precision data value corresponding to the geographical coordinate, for a buried asset. A buried asset data point may further comprise depth measurement data, and electrical current measurement data. The device 120 uploads the buried asset data points 204 to the server 102 via the network 106.

In step 304, the server 102 automatically creates a two-dimensional or three-dimensional buffer zone around the buried asset data points 204, as defined more fully below, with reference to FIGS. 4A through 8. A buffer zone is any data or data set that defines an area, location, place, solid or perimeter where a buried asset is located. Inherent in a buffer zone is the characteristic that two zones or areas are being separated.

Parallel to steps 302, 304, in step 316, an excavator 220 sends to server 102 the position data 230 for a proposed excavation zone. The position data may take a variety of forms, including a set of geographical coordinates, a definition of a two-dimensional surface, a definition of a three-dimensional solid, any set of position data that defines a two or three-dimensional area, etc. In step 318, the server 102 automatically creates a two-dimensional or three-dimensional excavation zone 230, as defined more fully below.

In step 306, the buffer zone generated by the server 102 and the excavation zone generated by the server 102 are compared to determine whether there is an incursion of the excavation zone into the buffer zone. In one embodiment, collision detection techniques known in the art may be used to determine whether the two or three dimensional buffer zone intersects with the two or three dimensional excavation zone. The result of the outcome of step 306 is stored in memory of server 102 and/or in the database 104 as a data element that indicates whether the two or three dimensional buffer zone intersects with the two or three dimensional excavation zone. In step 308, if there is an incursion, then control flows to step 310. If there is no incursion, then control flows to step 320. In step 320, since there is no incursion, there is no need for a locate technician to be dispatched to the excavation site and the ticket is closed. The outcome shown in step 320 illustrates an instance wherein a locate technician was not dispatched because it was not deemed necessary by step 308, thereby increasing efficiency.

In step 310, an incursion of the excavation zone into a buried asset has been detected, and therefore the server 102 transmits a locate request 252 to the device 120 of technician 110. The locate request may define the excavation zone and the buffer zone generated by the server 102 and may include a request to perform a locate procedure. In step 312, the technician 110 travels to the proposed excavation site and performs a locate procedure at the proposed excavation site, which includes (in step 314) marking out the location of the buried asset on the ground using, for example, temporary spray paint. Subsequently, the ticket is closed. The outcome of step 314 showcases how dispatches only occur when the chance of an excavation zone incursion into a buried asset is too high, as calculated by step 308, thereby reducing the number of false dispatches.

Figure 4A:
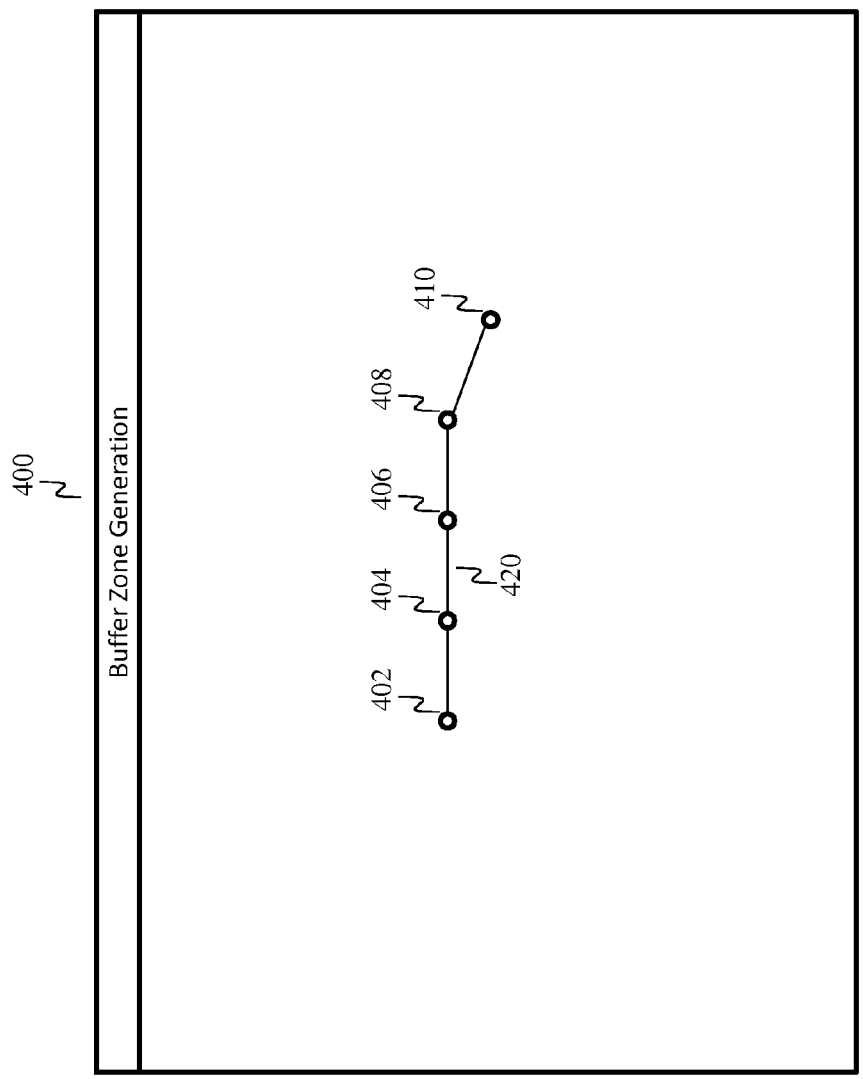
FIG. 4A is an illustration of a graphical user interface that shows buried asset data points connected via line segments, according to an example embodiment.

FIGS. 4A through 8 depict illustrations of graphical user interfaces (GUI) that show how a buffer zone is generated using buried asset data points, according to an example embodiment. In FIG. 4A, the GUI 400 shows that five buried asset data points 402, 404, 406, 408 and 410 are displayed according to their corresponding geographical coordinate data. The buried asset data points 402, 404, 406, 408 and 410 are connected via straight line segments to form a central line 420 that represents an approximation of the location of the buried asset in between the buried asset data points 402, 404, 406, 408 and 410.

Figure 4B:
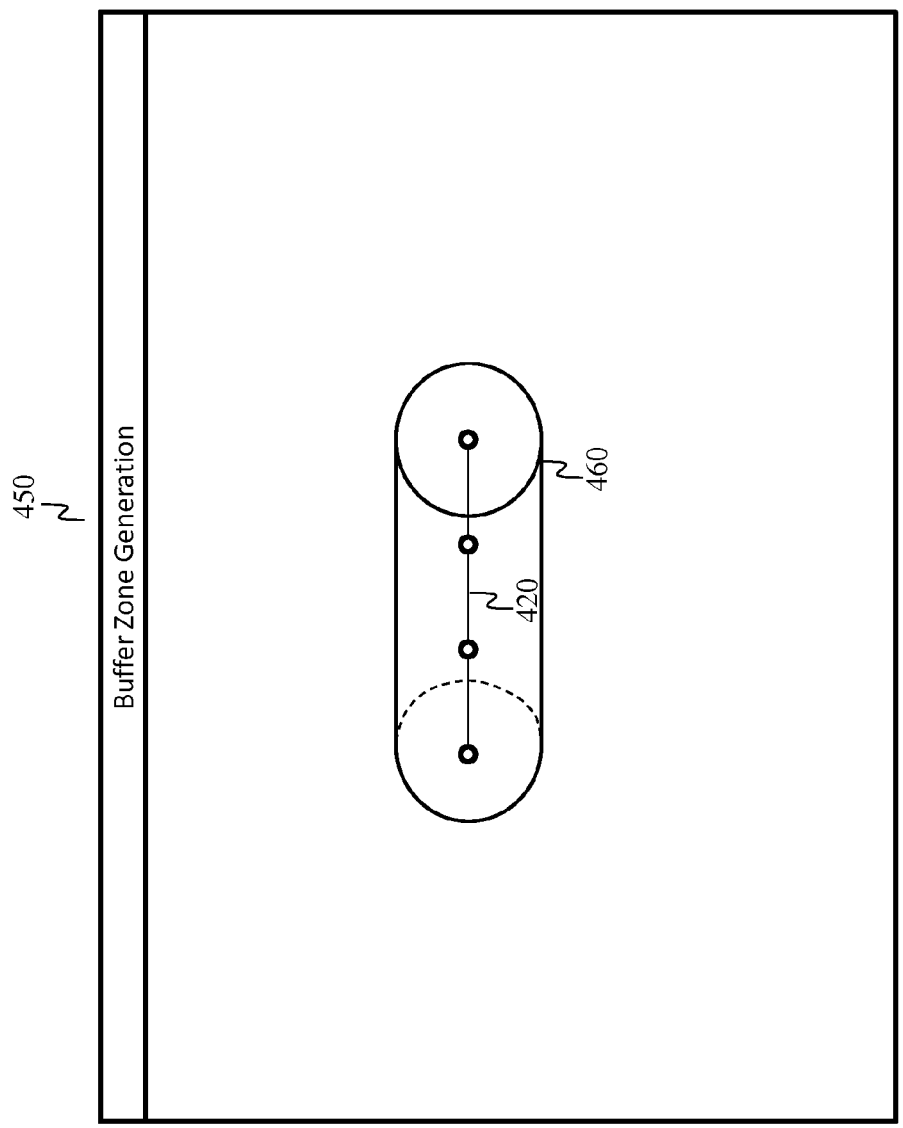
FIG. 4B is an illustration of a graphical user interface that shows buried asset data points surrounded by a three dimensional solid, according to an example embodiment.
Figure 5:
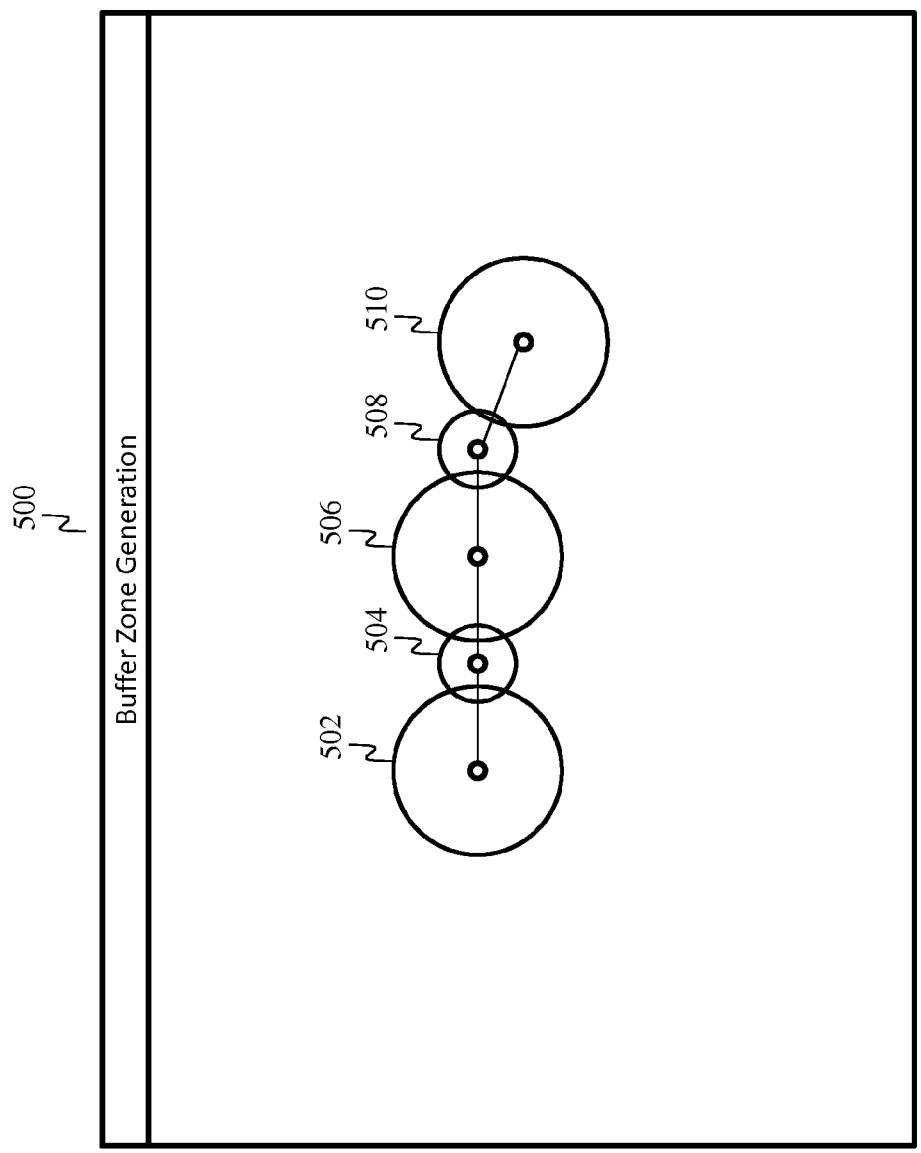
FIG. 5 is an illustration of a graphical user interface that shows buried asset data points connected via line segments and circular areas of varying size defined around each data point, according to an example embodiment.
Figure 6:
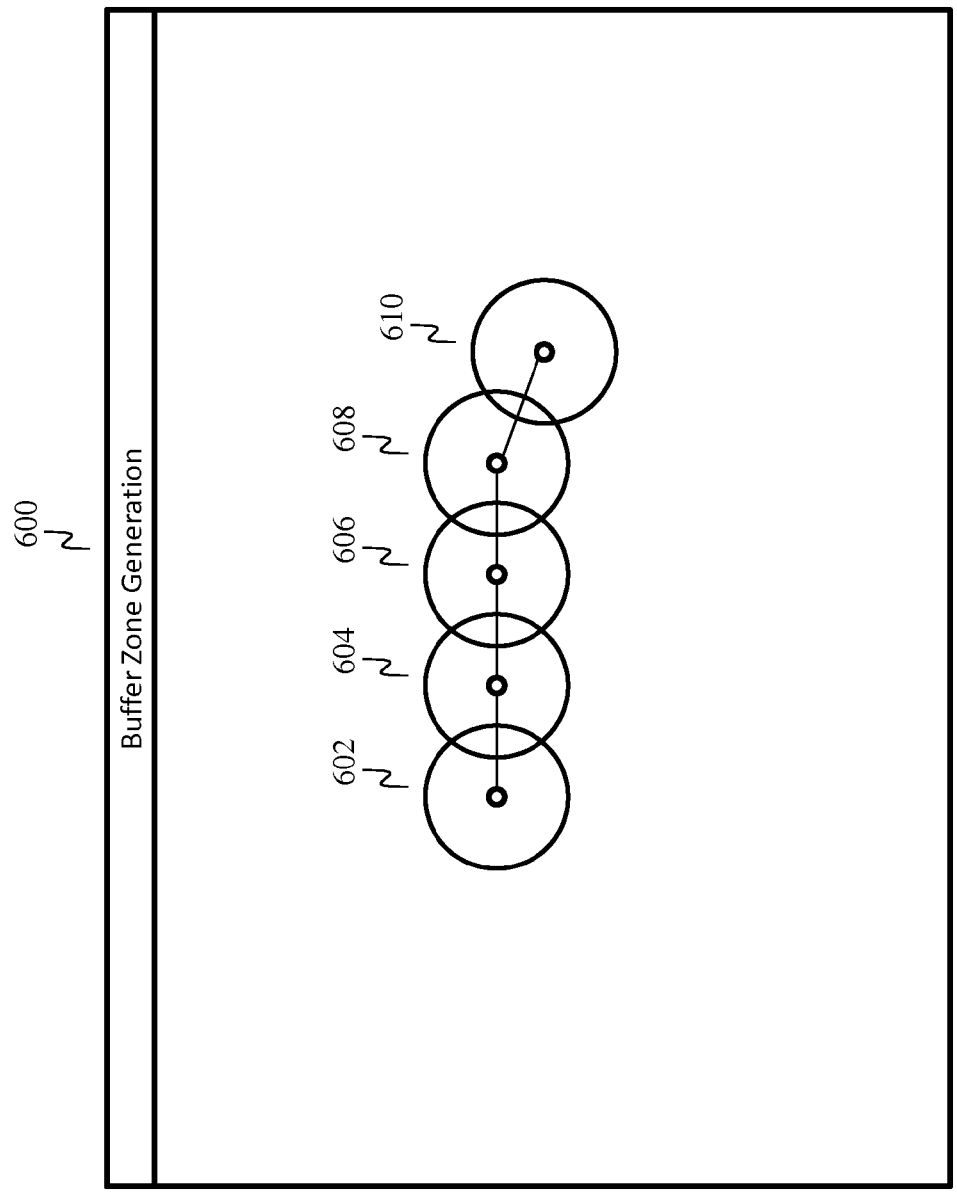
FIG. 6 is an illustration of a graphical user interface that shows buried asset data points connected via line segments and circular areas of uniform size defined around each data point, according to an example embodiment.
Figure 7:
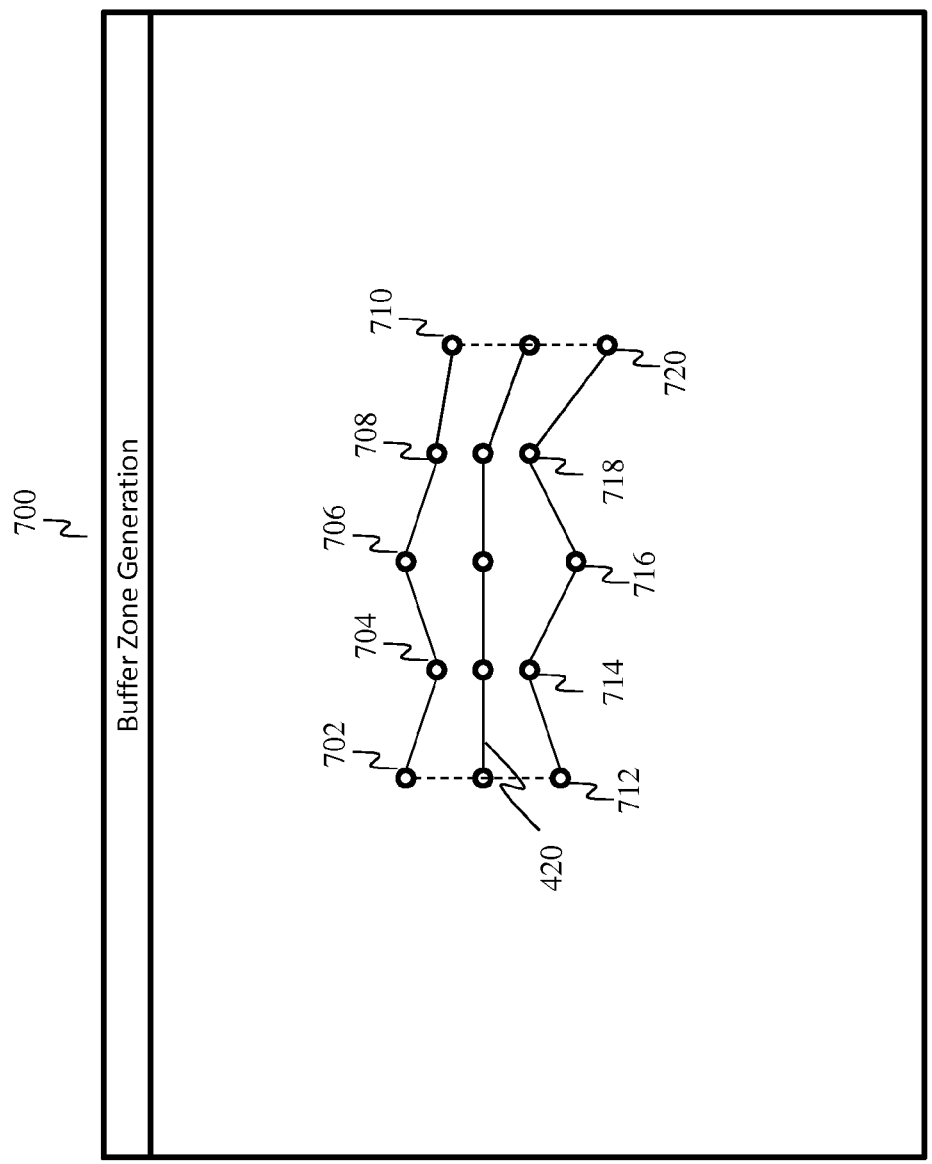
FIG. 7 is an illustration of a graphical user interface that shows buried asset data points connected via line segments and areas of varying size defined around each data point, according to an example embodiment.
Figure 8:
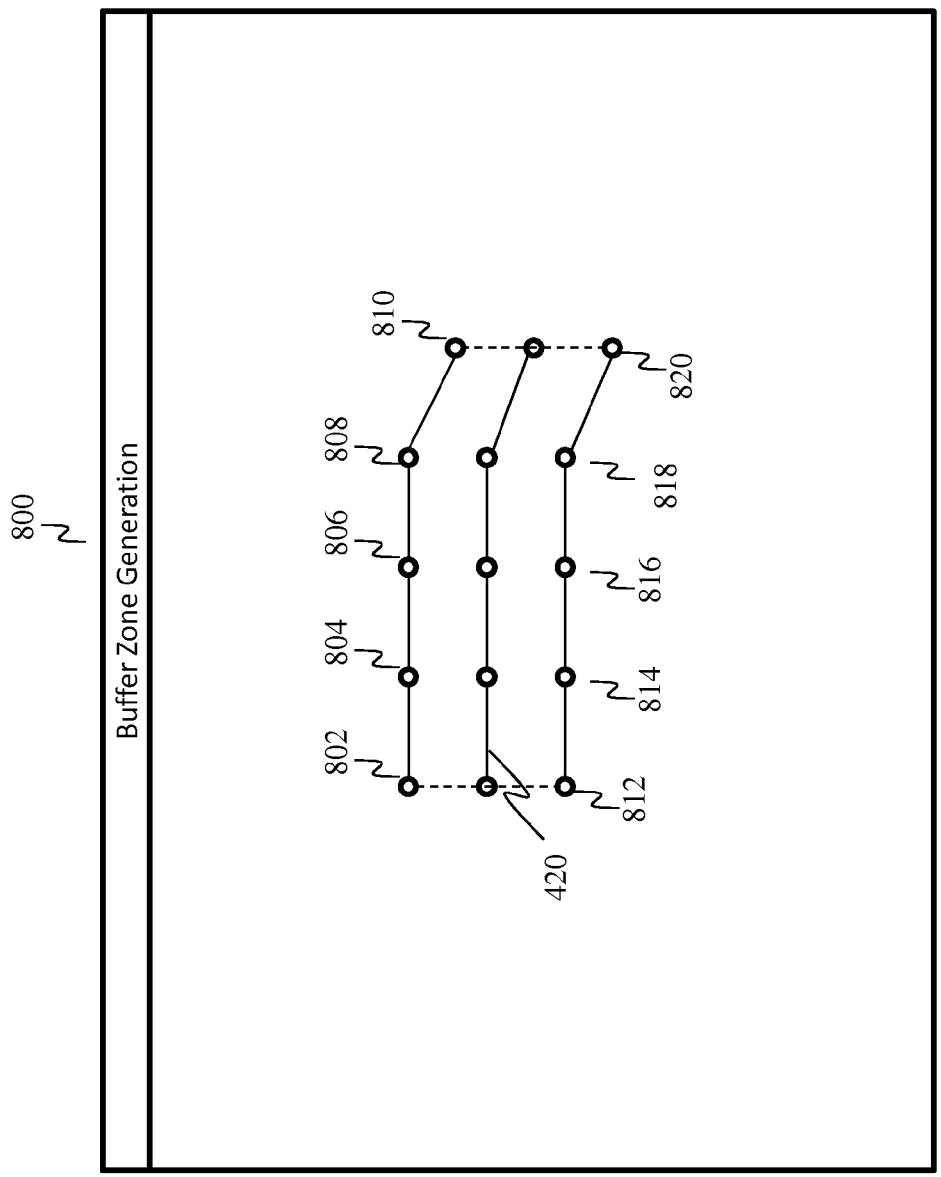
FIG. 8 is an illustration of a graphical user interface that shows buried asset data points connected via line segments and areas of uniform size defined around each data point, according to an example embodiment.

GUI 450 of FIG. 4B shows that a three-dimensional solid comprising a buffer zone has been created around the buried asset data points 402, 404, 406, and 408. In GUI 450, the three-dimensional solid was generated by defining a two-dimensional circle around each buried asset data point, wherein each circle is perpendicular to the central line 420, so as to create a cylindrical three-dimensional solid that surrounds the central line 420. The radius of the circles corresponds to the average of all or a portion of all precision data values corresponding to the geographical coordinates of the buried asset data points shown in GUI 450. Once the circles have been defined for all buried asset data points, the circles are combined to define the outer surface of a three-dimensional solid cylinder comprising the buffer zone that surrounds the central line 420.

In one embodiment, in GUI 450 the three-dimensional solid (comprising the buffer zone) generated around the buried asset data points is generated as follows: 1) define the central line 420, as defined above, 2) read the precision data values of all or a portion of the geographical coordinates of the buried asset data points in GUI 450, and calculate an average value thereof, 3) generate a radius value that corresponds to the average value (such as by multiplying the average value by a constant that represents the desired size of the buffer), 4) for each buried asset data point, generate a two-dimensional circle with a radius equal to the radius value, using the buried asset data point as the center, and wherein the circle is perpendicular to the central line, 5) join all circles so as to define the outer surface of a three-dimensional solid cylinder comprising the buffer zone that surrounds the central line 420. In GUI 450, the radius of the circles is larger when the average precision data value of the buried asset data points reflects low precision and the radius is smaller when it reflects high precision.

GUI 500 shows that a circular two-dimensional area comprising a buffer zone has been created around each buried asset data point, wherein the union of all of the circular two-dimensional areas comprises the buffer zone around the buried asset data points. The size of each circular two-dimensional area corresponds to the precision data value corresponding to the geographical coordinate of the buried asset data point. In one embodiment, the circular two-dimensional area generated around each buried asset data point is generated as follows: 1) read the precision data value of the geographical coordinate of the buried asset data point, 2) generate a radius value that corresponds to the precision data value (such as by multiplying the precision data value by a constant that represents the desired size of the buffer), 3) create a circle around the buried asset data point using the radius value as the radius measurement of the circle.

In one embodiment, the size of the circle created around a buried asset data point is larger when the precision data value reflects low precision and the circle is smaller when it reflects high precision. Thus, when the geographical coordinate of the buried asset data point has low precision (according to the precision data value), then the circular two-dimensional area is larger. When the geographical coordinate of the buried asset data point has high precision (according to the precision data value), then the circular two-dimensional area is smaller. Consequently, the circular areas 502, 506 and 510 are large because the geographical coordinates of the buried asset data points 402, 406 and 410 have low precision. Further, the circular areas 504, 508 are small because the geographical coordinates of the buried asset data points 404, 408 have high precision.

GUI 600 shows that a circular two-dimensional area of uniform size has been created around each buried asset data point, wherein the union of all of the circular two-dimensional areas comprises the buffer zone around the buried asset data points. In GUI 600, the precision data values corresponding to the geographical coordinates of the buried asset data points have been averaged and used to generate the circular two-dimensional areas 602, 604, 606, 608, 610. In one embodiment, the circular two-dimensional area generated around each buried asset data point is generated as follows: 1) read the precision data values of the geographical coordinates of all, or a portion of, the buried asset data points, 2) average the precision data values, 3) generate a radius value that corresponds to the average precision data value (such as by multiplying the average value by a constant that represents the desired size of the buffer), 4) create a circle around each buried asset data point using the radius value as the radius measurement of each circle.

GUI 700 shows that a two-dimensional area comprising a buffer zone has been created around the buried asset data points. The two-dimensional area was generated by defining buffer points on either side of each buried asset data point so as to create a corridor-type area that surrounds the central line 420. Namely, a pair of buffer points has been defined on either side of each buried asset data point, i.e., a point to the left and a point to the right. The distance of the pair of buffer points from the buried asset data point corresponds to the precision data value corresponding to the geographical coordinate of the buried asset data point. Once the pair of buffer points has been defined for each buried asset data point, the buffer points to the right of the central line 420 are connected via line segments, and the buffer points to the left of the central line 420 are connected via line segments, so as to generally define a two-dimensional area comprising the buffer zone that surrounds the central line 420. Note also that the ends of the corridor are closed by joining the first buffer point 712 to the right of the central line with the first buffer point 702 to the left of the central line, and by joining the last buffer point 720 to the right of the central line with the last buffer point 710 to the left of the central line.

In one embodiment, the two-dimensional area (comprising the buffer zone) generated around the buried asset data points is generated as follows: 1) define the central line 420, as defined above, 2) read the precision data value of the geographical coordinate of the first buried asset data point, 3) generate a radius value that corresponds to the precision data value (such as by multiplying the precision data value by a constant that represents the desired size of the buffer), 4) generate a buffer point having a distance equal to the radius value from the first buried asset data point but also being on a line perpendicular to, and located to one—e.g., the right-side of the central line, 5) generate a buffer point having a distance equal to the radius value from the first buried asset data point but also being on a line perpendicular to, and located to the other—e.g., the left-side of the central line, 6) repeat steps 2 through 6 for all remaining buried asset data points, 7) join all buffer points on one—e.g., the right-side of the central line using straight line segments, 8) join all buffer points on the other—e.g., the left-side of the central line using straight line segments, 9) join the first buffer point on one—e.g., the right-side of the central line with the first buffer point on the other—e.g., the left-side of the central line, 10) join the last buffer point on one—e.g., the right-side of the central line with the last buffer point on the other—e.g., the left-side of the central line.

Again, in GUI 700, the distance of a buffer point from a buried asset data point is larger when the precision data value of that buried asset data point reflects low precision and the distance is smaller when it reflects high precision.

GUI 800 shows that another two-dimensional area comprising a buffer zone has been created around the buried asset data points. Like GUI 700, the two-dimensional area in GUI 800 was generated by defining buffer points on either side of each buried asset data point so as to create a corridor-type area that surrounds the central line 420. But in GUI 800, the distance of the pair of buffer points from the buried asset data point corresponds to the average of all or a portion of all precision data values corresponding to the geographical coordinates of the buried asset data points shown in GUI 800. Once the pair of buffer points has been defined for each buried asset data point, the buffer points to the right of the central line 420 are connected via line segments, and the buffer points to the left of the central line 420 are connected via line segments, so as to generally define a two-dimensional area comprising the buffer zone that surrounds the central line 420. Note also that the ends of the corridor are closed by joining the first buffer point 812 to the right of the central line with the first buffer point 802 to the left of the central line, and by joining the last buffer point 820 to the right of the central line with the last buffer point 810 to the left of the central line.

In one embodiment, in GUI 800 the two-dimensional area (comprising the buffer zone) generated around the buried asset data points is generated as follows: 1) define the central line 420, as defined above, 2) read the precision data values of all or a portion of the geographical coordinates of the buried asset data points in GUI 800, and calculate an average value thereof, 3) generate a radius value that corresponds to the average value (such as by multiplying the average value by a constant that represents the desired size of the buffer), 4) for each buried asset data point, generate a buffer point having a distance equal to the average value from the first buried asset data point but also being on a line perpendicular to, and located to one—e.g., the right-side of the central line, 5) for each buried asset data point, generate a buffer point having a distance equal to the average value from the first buried asset data point but also being on a line perpendicular to, and located to the other—e.g., the left-side of the central line, 6) join all buffer points on one—e.g., the right-side of the central line using straight line segments, 7) join all buffer points on the other—e.g., the left-side of the central line using straight line segments, 8) join the first buffer point on one—e.g., the right-side of the central line with the first buffer point on the other—e.g., the left-side of the central line, 9) join the last buffer point on one—e.g., the right-side of the central line with the last buffer point on the other—e.g., the left-side of the central line.

Again, in GUI 800, the distance of a buffer point from a buried asset data point is larger when the average precision data value of the buried asset data points reflects low precision and the distance is smaller when it reflects high precision.

Figure 9:
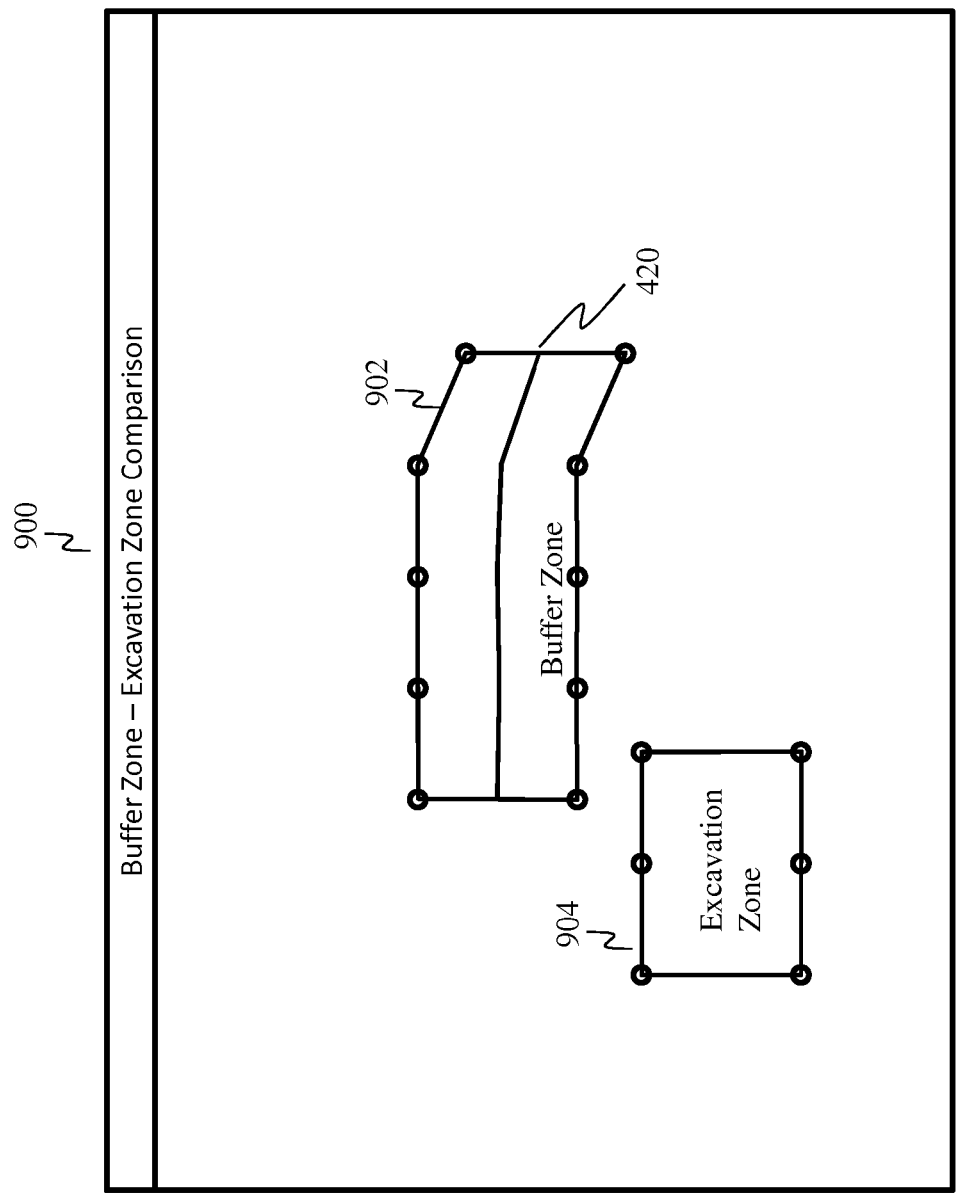
FIG. 9 is an illustration of a graphical user interface that shows a buffer zone defined around buried asset data points and a proposed excavation zone, according to an example embodiment.

FIG. 9 is an illustration of a GUI 900 that shows a two-dimensional buffer zone 902 defined around buried asset data points and a two-dimensional proposed excavation zone 904, according to an example embodiment. The GUI 900 shows that buffer zone 902 does not intersect with excavation zone 904, and therefore there is no need for a technician 110 to be dispatched to perform a locate procedure at the location of excavation zone 904.

Figure 10:
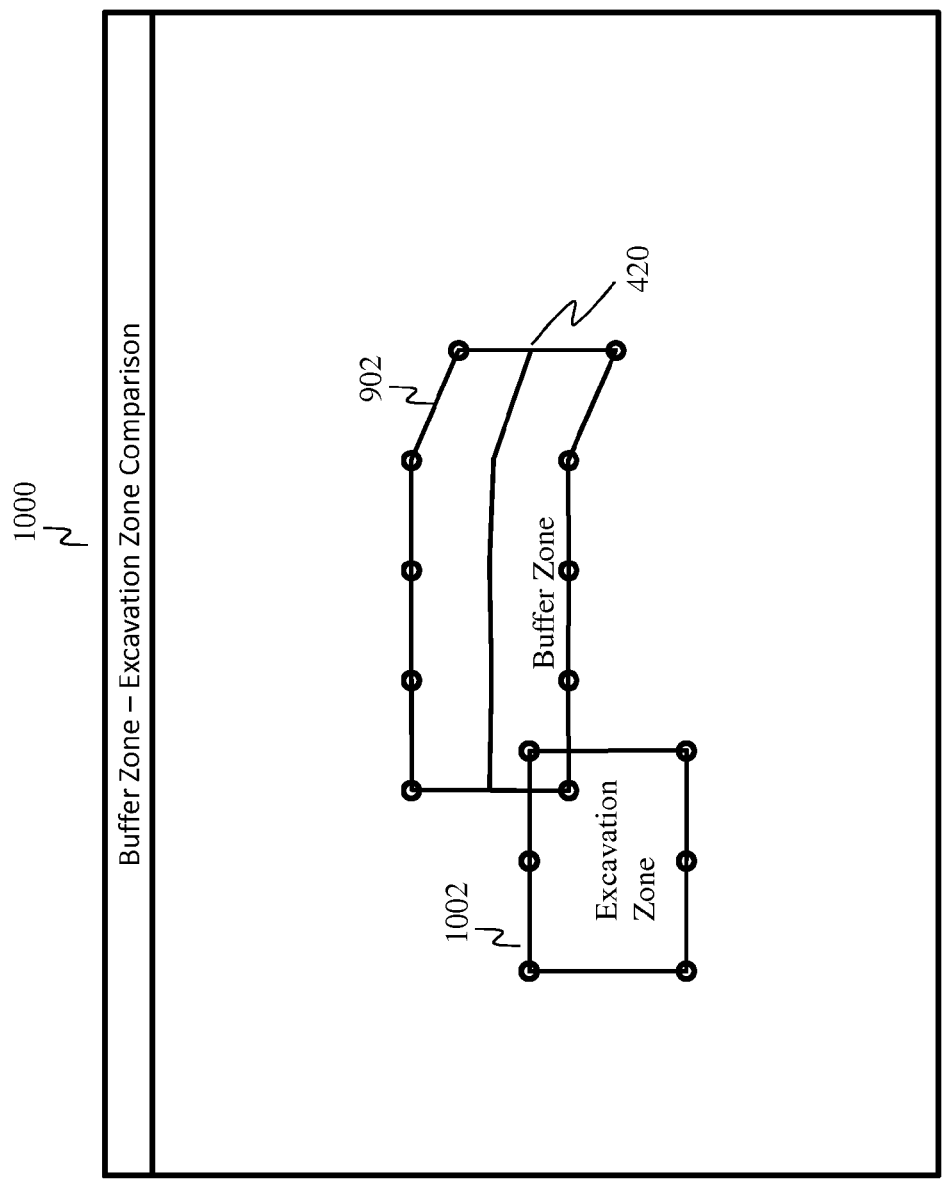
FIG. 10 is an illustration of a graphical user interface that shows a buffer zone defined around buried asset data points, wherein the buffer zone overlaps with a proposed excavation zone, according to an example embodiment.

FIG. 10 is an illustration of another GUI 1000 that shows a two-dimensional buffer zone 902 defined around buried asset data points and a two-dimensional proposed excavation zone 904, according to an example embodiment. The GUI 1000 shows that buffer zone 902 intersect with excavation zone 904, and therefore there is a need for a technician 110 to be dispatched to perform a locate procedure at the location of excavation zone 904

Figure 11:
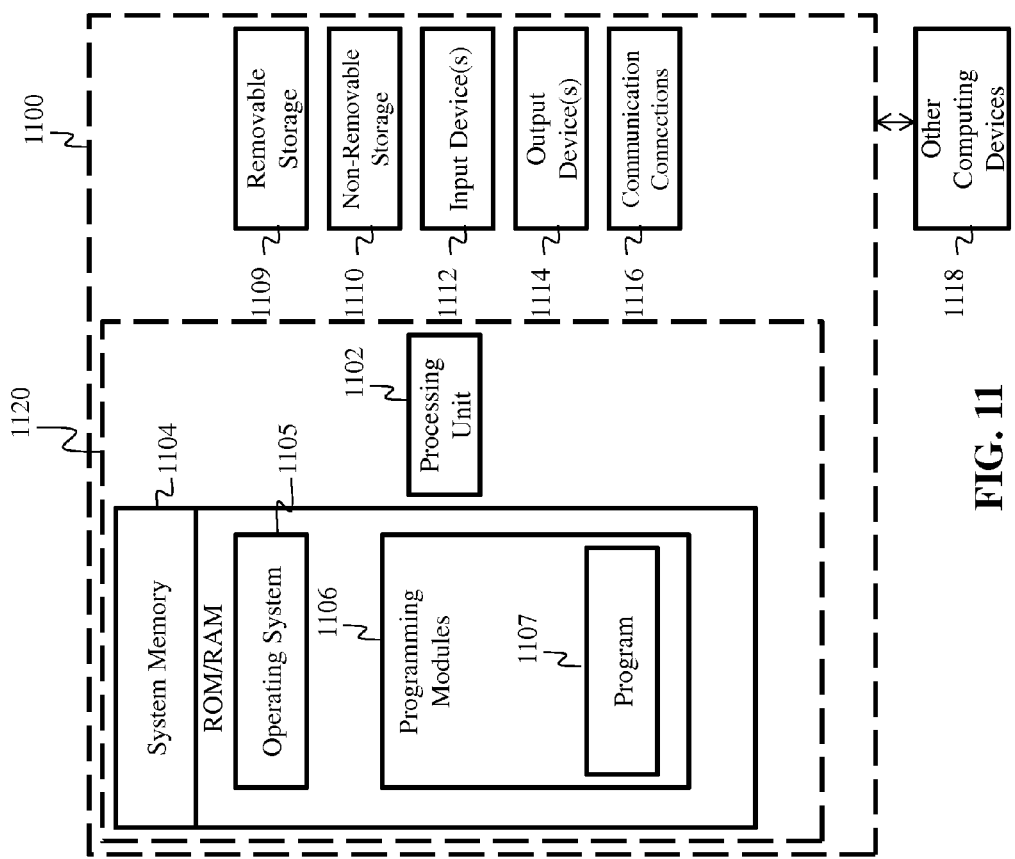
FIG. 11 is a block diagram of a system including a computing device, according to an example embodiment.

FIG. 11 is a block diagram of a system including an example computing device 1100 and other computing devices. Consistent with the embodiments described herein, the aforementioned actions performed by server 102, device 120, and antenna array 112 may be implemented in a computing device, such as the computing device 1100 of FIG. 11. Any suitable combination of hardware, software, or firmware may be used to implement the computing device 1100. The aforementioned system, device, and processors are examples and other systems, devices, and processors may comprise the aforementioned computing device. Furthermore, computing device 1100 may comprise an operating environment for system 100 and process 300, as described above. Process 300 may operate in other environments and are not limited to computing device 1100.

With reference to FIG. 11, a system consistent with an embodiment of the invention may include a plurality of computing devices, such as computing device 1100. In a basic configuration, computing device 1100 may include at least one processing unit 1102 and a system memory 1104. Depending on the configuration and type of computing device, system memory 1104 may comprise, but is not limited to, volatile (e.g. random access memory (RAM)), non-volatile (e.g. read-only memory (ROM)), flash memory, or any combination or memory. System memory 1104 may include operating system 1105, and one or more programming modules 1106. Operating system 1105, for example, may be suitable for controlling computing device 1100's operation. In one embodiment, programming modules 1106 may include, for example, a program module 1107 for executing the actions of server 102, and device 120. Furthermore, embodiments of the invention may be practiced in conjunction with a graphics library, other operating systems, or any other application program and is not limited to any particular application or system. This basic configuration is illustrated in FIG. 11 by those components within a dashed line 1120.

Computing device 1100 may have additional features or functionality. For example, computing device 1100 may also include additional data storage devices (removable and/or non-removable) such as, for example, magnetic disks, optical disks, or tape. Such additional storage is illustrated in FIG. 11 by a removable storage 1109 and a non-removable storage 1110. Computer storage media may include volatile and non-volatile, removable and non-removable media implemented in any method or technology for storage of information, such as computer readable instructions, data structures, program modules, or other data. System memory 1104, removable storage 1109, and non-removable storage 1110 are all computer storage media examples (i.e. memory storage.) Computer storage media may include, but is not limited to, RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store information and which can be accessed by computing device 1100. Any such computer storage media may be part of device 1100. Computing device 1100 may also have input device(s) 1112 such as a keyboard, a mouse, a pen, a sound input device, a camera, a touch input device, etc. Output device(s) 1114 such as a display, speakers, a printer, etc. may also be included. The aforementioned devices are only examples, and other devices may be added or substituted.

Computing device 1100 may also contain a communication connection 1116 that may allow device 1100 to communicate with other computing devices 1118, such as over a network in a distributed computing environment, for example, an intranet or the Internet. Communication connection 1116 is one example of communication media. Communication media may typically be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media. The term computer readable media as used herein may include both computer storage media and communication media.

As stated above, a number of program modules and data files may be stored in system memory 1104, including operating system 1105. While executing on processing unit 1102, programming modules 1106 (e.g. program module 1107) may perform processes including, for example, one or more of the stages of the process 900 as described above. The aforementioned processes are examples, and processing unit 1102 may perform other processes. Other programming modules that may be used in accordance with embodiments of the present invention may include electronic mail and contacts applications, word processing applications, spreadsheet applications, database applications, slide presentation applications, drawing or computer-aided application programs, etc.

Generally, consistent with embodiments of the invention, program modules may include routines, programs, components, data structures, and other types of structures that may perform particular tasks or that may implement particular abstract data types. Moreover, embodiments of the invention may be practiced with other computer system configurations, including hand-held devices, multiprocessor systems, microprocessor-based or programmable consumer electronics, minicomputers, mainframe computers, and the like. Embodiments of the invention may also be practiced in distributed computing environments where tasks are performed by remote processing devices that are linked through a communications network. In a distributed computing environment, program modules may be located in both local and remote memory storage devices.

Furthermore, embodiments of the invention may be practiced in an electrical circuit comprising discrete electronic elements, packaged or integrated electronic chips containing logic gates, a circuit utilizing a microprocessor, or on a single chip (such as a System on Chip) containing electronic elements or microprocessors. Embodiments of the invention may also be practiced using other technologies capable of performing logical operations such as, for example, AND, OR, and NOT, including but not limited to mechanical, optical, fluidic, and quantum technologies. In addition, embodiments of the invention may be practiced within a general purpose computer or in any other circuits or systems.

Embodiments of the present invention, for example, are described above with reference to block diagrams and/or operational illustrations of methods, systems, and computer program products according to embodiments of the invention. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While certain embodiments of the invention have been described, other embodiments may exist. Furthermore, although embodiments of the present invention have been described as being associated with data stored in memory and other storage mediums, data can also be stored on or read from other types of computer-readable media, such as secondary storage devices, like hard disks, floppy disks, or a CD-ROM, or other forms of RAM or ROM. Further, the disclosed methods' stages may be modified in any manner, including by reordering stages and/or inserting or deleting stages, without departing from the invention.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method on a computing device for defining a buffer zone around a buried asset at an above-surface location, the method comprising:
receiving and storing a plurality of buried asset data points, wherein each buried asset data point comprises a geographical coordinate and a precision data value corresponding to the geographical coordinate, wherein a precision data value is one of a set of ascending values of a level of precision of the geographical coordinate, and wherein the plurality of buried asset data points correspond to analog radio frequency signals that were detected and read from the buried asset at the above-surface location; and generating a first data structure that represents a two dimensional area comprising a buffer zone at the above-surface location, wherein the first data structure is generated by defining an area around each geographical coordinate of the plurality of buried asset data points, and wherein a size of each area is based on the precision data values of the plurality of buried asset data points.

2. The method of claim 1, further comprising:
receiving a second data structure that represents a two dimensional area comprising an excavation zone at the above-surface location;
calculating whether the two dimensional area of the first data structure intersects with the two dimensional area of the second data structure; and
transmitting a request for a locate procedure to a user via a communications network communicatively coupled with the computing device, if the two dimensional area of the first data structure intersects with the two dimensional area of the second data structure.

3. The method of claim 2, wherein the step of generating the first data structure that represents the two dimensional area further comprises:
calculating an average precision data value based on the precision data values of the plurality of buried asset data points;
defining a central line comprising points defined by the geographical coordinates of the plurality of buried asset data points; and
defining an area on each side of the central line, wherein a size of the area is based on the average precision data value.

4. The method of claim 2, wherein the step of receiving and storing a plurality of buried asset data points further comprises:
receiving, from a mobile computing device via the communications network, the plurality of buried asset data points.

5. The method of claim 4, wherein the step of receiving and storing a plurality of buried asset data points further comprises:
receiving the plurality of buried asset data points, wherein each buried asset data point further comprises a precision data value corresponding to a depth measurement of the buried asset data point.

6. The method of claim 5, wherein the step of generating the first data structure that represents the two dimensional area further comprises:
generating the first data structure that represents the two dimensional area comprising the buffer zone at the above-surface location, wherein the first data structure is generated by defining an area around each geographical coordinate of the plurality of buried asset data points, wherein a size of the area around a particular geographical coordinate is based on the precision data value corresponding to the geographical coordinate.

7. The method of claim 6, wherein the precision data value corresponding to the geographical coordinate is inversely proportional to an amount of precision of the geographical coordinate.

8. A method on a server for defining a buffer zone around a buried asset, the server communicatively coupled with a communications network, the method comprising:
receiving and storing a plurality of buried asset data points, wherein each buried asset data point comprises a depth measurement data, a geographical coordinate and a precision data value corresponding to the geographical coordinate, wherein a precision data value is one of a set of ascending values of a level of precision of the geographical coordinate, and wherein the plurality of buried asset data points correspond to analog radio frequency signals that were detected and read from the buried asset at an above-surface location; and
generating a first data structure that represents a three dimensional solid comprising a buffer zone, wherein the first data structure is generated by defining a three dimensional solid around the geographical coordinates of the plurality of buried asset data points, wherein a size of the three dimensional solid is based on the precision data values of the plurality of buried asset data points.

9. The method of claim 8, further comprising:
receiving a second data structure that represents a two dimensional surface comprising an excavation zone at the above-surface location;
calculating whether the three dimensional solid of the first data structure intersects with the two dimensional surface of the second data structure; and
transmitting a request for a locate procedure to a user via the communications network, if the three dimensional solid of the first data structure intersects with the two dimensional surface of the second data structure.

10. The method of claim 9, wherein the step of generating the first data structure that represents the three dimensional solid further comprises:
calculating an average precision data value based on the precision data values of the plurality of buried asset data points;
defining a central line comprising points defined by the geographical coordinates of the plurality of buried asset data points; and
defining a three dimensional solid around the central line, wherein a size of the three dimensional solid is based on the average precision data value.

11. The method of claim 9, wherein the step of receiving and storing a plurality of buried asset data points further comprises:
receiving, from a mobile computing device via the communications network, the plurality of buried asset data points.

12. The method of claim 11, wherein the step of receiving and storing a plurality of buried asset data points further comprises:
receiving the plurality of buried asset data points, wherein each buried asset data point further comprises a precision data value corresponding to the depth measurement data of the buried asset data point.

13. The method of claim 12, wherein the step of generating the first data structure that represents the three dimensional solid further comprises:
generating the first data structure that represents the three dimensional surface comprising the excavation zone, wherein the first data structure is generated by defining a three dimensional solid around each geographical coordinate of the plurality of buried asset data points, wherein a size of the three dimensional solid around a particular geographical coordinate is based on the precision data value corresponding to the geographical coordinate.

14. The method of claim 13, wherein the precision data value corresponding to the geographical coordinate is inversely proportional to an amount of precision of the geographical coordinate.

15. A method on a server for defining a buffer zone around a buried asset at an above-surface location, the server communicatively coupled with a communications network, the method comprising:
- receiving and storing a plurality of buried asset data points, wherein each buried asset data point comprises a depth measurement data, electrical current measurement data, a geographical coordinate and a precision data value corresponding to the geographical coordinate, wherein a precision data value is one of a set of ascending values of a level of precision of the geographical coordinate, and, wherein the plurality of buried asset data points correspond to analog radio frequency signals that were detected and read from the buried asset at the above-surface location; and
- generating a first data structure that represents a two dimensional area comprising a buffer zone at the above-surface location, wherein the first data structure is generated by defining an area around each geographical coordinate of the plurality of buried asset data points, wherein a size of each area is based on the precision data values of the plurality of buried asset data points.

16. The method of claim 15, further comprising:
- receiving a second data structure that represents a two dimensional area comprising an excavation zone at the above-surface location;
- calculating whether the two dimensional area of the first data structure intersects with the two dimensional area of the second data structure; and
- transmitting a request for a locate procedure to a user via the communications network, if the two dimensional area of the first data structure intersects with the two dimensional area of the second data structure.

17. The method of claim 16, wherein the step of generating the first data structure that represents the two dimensional area at the above-surface location further comprises:
- defining a central line comprising points defined by the geographical coordinates of the plurality of buried asset data points; and
- defining an area on each side of the central line, wherein a size of the area is based on a predefined value.

18. The method of claim 16, wherein the step of receiving and storing a plurality of buried asset data points further comprises:
- receiving, from a mobile computing device via the communications network, the plurality of buried asset data points.

19. The method of claim 18, wherein the step of receiving and storing a plurality of buried asset data points further comprises:
- receiving the plurality of buried asset data points, wherein each buried asset data point further comprises a precision data value corresponding to the depth measurement data of the buried asset data point.

20. The method of claim 19, wherein the predefined value is adjustable by an administrator.

* * * * *